US012526986B2

(12) United States Patent
Hsu et al.

(10) Patent No.: US 12,526,986 B2
(45) Date of Patent: Jan. 13, 2026

(54) NON-VOLATILE MEMORY CELL OF ARRAY STRUCTURE AND ASSOCIATED CONTROLLING METHOD

(71) Applicant: eMemory Technology Inc., Hsin-chu (TW)

(72) Inventors: Chia-Jung Hsu, Hsinchu County (TW); Yun-Jen Ting, Hsinchu County (TW); Cheng-Heng Chung, Hsinchu County (TW); Chun-Hsiao Li, Hsinchu County (TW); Tsung-Mu Lai, Hsinchu County (TW)

(73) Assignee: EMEMORY TECHNOLOGY INC., Hsin-Chu (TW)

(*) Notice: Subject to any disclaimer, the term of this patent is extended or adjusted under 35 U.S.C. 154(b) by 118 days.

(21) Appl. No.: 18/417,389

(22) Filed: Jan. 19, 2024

(65) Prior Publication Data

US 2024/0395342 A1 Nov. 28, 2024

Related U.S. Application Data

(60) Provisional application No. 63/468,561, filed on May 24, 2023.

(51) Int. Cl.
*G11C 16/10* (2006.01)
*G11C 16/26* (2006.01)
(Continued)

(52) U.S. Cl.
CPC ............. *H10B 20/25* (2023.02); *G11C 16/10* (2013.01); *G11C 16/26* (2013.01); *G11C 16/3427* (2013.01); *G11C 17/16* (2013.01); *G11C 17/18* (2013.01); *H10B 41/35* (2023.02); *H10B 43/35* (2023.02)

(58) Field of Classification Search
CPC ........ H10B 20/25; H10B 41/35; H10B 43/35; G11C 16/10; G11C 16/26; G11C 16/3427; G11C 17/16; G11C 17/18; G11C 16/34; G11C 11/34; H10D 30/696; G06F 3/0688

See application file for complete search history.

(56) References Cited

U.S. PATENT DOCUMENTS

7,187,594 B2 * 3/2007 Shibata ................ G11C 7/1012
257/295
7,190,623 B2 3/2007 Hsu
(Continued)

*Primary Examiner* — Uyen Smet
(74) *Attorney, Agent, or Firm* — WPAT, PC (57) ABSTRACT

A non-volatile memory cell includes a select transistor and a memory transistor. The first drain/source terminal of the select transistor is connected with a first control terminal. The second drain/source terminal of the select transistor is connected with the first drain/source terminal of the memory transistor. The gate terminal of the select transistor is connected with a select gate terminal. The second drain/source terminal of the memory transistor is connected with a second control terminal. The gate terminal of the memory transistor is connected with a memory gate terminal. During a program action, the select transistor is turned on, and a tapered channel is formed in the memory transistor. The tapered channel is pinched off near the first drain/source terminal of the memory transistor, and plural hot carriers near a pinch off point are injected into the charge storage layer.

22 Claims, 4 Drawing Sheets

(51) Int. Cl.
  *G11C 16/34* (2006.01)
  *G11C 17/16* (2006.01)
  *G11C 17/18* (2006.01)
  *H10B 20/25* (2023.01)
  *H10B 41/35* (2023.01)
  *H10B 43/35* (2023.01)

(56) References Cited

U.S. PATENT DOCUMENTS

| | | | |
|---|---|---|---|
| 2005/0282332 A1* | 12/2005 | Hsu | H10B 43/30 |
| | | | 257/E21.679 |
| 2009/0046506 A1* | 2/2009 | Lue | G11C 11/5671 |
| | | | 365/185.17 |
| 2009/0116286 A1* | 5/2009 | Chong | G11C 5/04 |
| | | | 365/185.26 |

* cited by examiner

NON-VOLATILE MEMORY CELL OF ARRAY STRUCTURE AND ASSOCIATED CONTROLLING METHOD

This application claims the benefit of U.S. provisional application Ser. No. 63/468,561, filed May 24, 2023, the subject matters of which are incorporated herein by references.

FIELD OF THE INVENTION

The present invention relates to an array structure, and more particularly to a non-volatile memory cell of an array structure and an associated controlling method for the non-volatile memory cell.

BACKGROUND OF THE INVENTION

Non-volatile memories have been widely used in a variety of electronic products. After the supplied power is interrupted, the data stored in the non-volatile memory is still retained.

Generally, the non-volatile memory comprises an array structure. The array structure comprises plural non-volatile memory cells. The non-volatile memory cell comprises a storage device. The storage device comprises a charge storage layer. According to the number of stored charges in the charge storage layer, the storage state of the non-volatile memory cell can be determined. For example, the storage device is a charge-trap transistor or a floating gate transistor.

SUMMARY OF THE INVENTION

An embodiment of the present invention provides an array structure. The array structure includes a first non-volatile memory cell. The first non-volatile memory cell includes a well region, a first doped region, a second doped region, a third doped region, a first gate structure and a second gate structure. The first doped region, the second doped region and the third doped region are formed under a surface of the well region. The first doped region is connected with a first control terminal. The third doped region is connected with a second control terminal. The first gate structure is formed over the surface of the well region and arranged between the first doped region and the second doped region. The first gate structure is connected with a first select gate terminal. The well region, the first doped region, the second doped region and the first gate structure are collaboratively formed as a first select transistor. The second gate structure is formed over the surface of the well region and arranged between the second doped region and the third doped region. The second gate structure is connected with a first memory gate terminal. The well region, the second doped region, the third doped region and the second gate structure are collaboratively formed as a first memory transistor. The second gate structure comprises a first charge storage layer. When a program action is performed on the first non-volatile memory cell, the second control terminal receives a first voltage, the first control terminal receives a second voltage, the first select gate terminal receives an on voltage, and the first memory gate terminal receives a program operation voltage. When the first select transistor is turned on, the second voltage is transmitted from the first doped region to the second doped region. Consequently, a tapered channel is formed between the second doped region and the third doped region. The tapered channel is pinched off near the second doped region, and plural hot carriers near a pinch off point are injected into the first charge storage layer of the second gate structure. Consequently, the first non-volatile memory cell is in a programmed state.

Another embodiment of the present invention provides an array structure. The array structure includes a first non-volatile memory cell. The first non-volatile memory cell includes a well region, a first doped region, a second doped region, a third doped region, a first gate structure and a second gate structure. The first doped region, the second doped region and the third doped region are formed under a surface of the well region. The first doped region is connected with a first control terminal. The third doped region is connected with a second control terminal. The first gate structure is formed over the surface of the well region and arranged between the first doped region and the second doped region. The first gate structure is connected with a first select gate terminal, and the well region, the first doped region, the second doped region and the first gate structure are collaboratively formed as a first select transistor. The second gate structure is formed over the surface of the well region and arranged between the second doped region and the third doped region. The second gate structure is connected with a first memory gate terminal. The well region, the second doped region, the third doped region and the second gate structure are collaboratively formed as a first memory transistor. The second gate structure comprises a first charge storage layer. When a read action is performed on the first non-volatile memory cell, the well region receives a well voltage, the second control terminal receives a first voltage, the first control terminal receives a second voltage, the first select gate terminal receives an on voltage, and the first memory gate terminal receives a read operation voltage. The first voltage is higher than the second voltage. The well voltage is equal to the first voltage. When the first select transistor is turned on, the first non-volatile memory cell generates a read current. A storage state of the first non-volatile memory cell is determined according to a magnitude of the read current.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
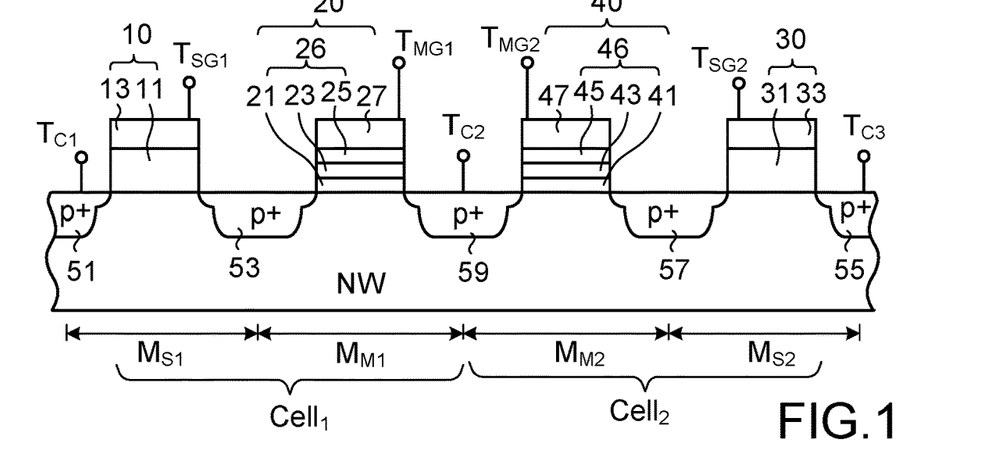
FIG. 1 is a schematic cross-sectional view illustrating an array structure with plural non-volatile memory cells according to an embodiment of the present invention.

FIG. 1 is a schematic cross-sectional view illustrating an array structure with plural non-volatile memory cells according to an embodiment of the present invention. As shown in FIG. 1, the array structure comprises two non-volatile memory cells $Cell_1$ and $Cell_2$. For brevity, the non-volatile memory cells $Cell_1$ and $Cell_2$ are referred as memory cells. The memory cell $Cell_1$ comprises a select transistor $M_{S1}$ and a memory transistor $M_{M1}$. The memory cell $Cell_2$ comprises a select transistor $M_{S2}$ and a memory transistor $M_{M2}$. The memory transistors $M_{M1}$ and $M_{M2}$ are storage devices of the memory cells. For example, the memory transistors $M_{M1}$ and $M_{M2}$ are charge-trap transistors or floating gate transistors.

As shown in FIG. 1, plural gate structures 10, 20, 30 and 40 are formed over a surface of an N-well region NW in a semiconductor substrate Sub. The gate structure 10 comprises a gate dielectric layer 11 and a gate layer 13. The gate structure 20 comprises a charge storage structure 26 and a gate layer 27. The charge storage structure 26 further comprises a gate dielectric layer 21, a charge storage layer 23 and an isolation layer 25. The gate structure 30 comprises a gate dielectric layer 31 and a gate layer 33. The gate structure 40 comprises a charge storage structure 46 and a gate layer 47. The charge storage structure 46 further comprises a gate dielectric layer 41, a charge storage layer 43 and an isolation layer 45.

Please refer to FIG. 1 again. In the gate structure 10, the gate dielectric layer 11 is formed over the N-well region NW, and the gate layer 13 is formed over the gate dielectric layer 11 to cover the gate dielectric layer 11. In the gate structure 20, the gate dielectric layer 21 is formed over the N-well region NW, the charge storage layer 23 is formed over the gate dielectric layer 21 to cover the gate dielectric layer 21, the isolation layer 25 is formed over the charge storage layer 23 to cover the charge storage layer 23, and the gate layer 27 is formed over the isolation layer 25 to cover the isolation layer 25. In the gate structure 30, the gate dielectric layer 31 is formed over the N-well region NW, and the gate layer 33 is formed over the gate dielectric layer 31 to cover the gate dielectric layer 31. In the gate structure 40, the gate dielectric layer 41 is formed over the N-well region NW, the charge storage layer 43 is formed over the gate dielectric layer 41 to cover the gate dielectric layer 41, the isolation layer 45 is formed over the charge storage layer 43 to cover the charge storage layer 43, and the gate layer 47 is formed over the isolation layer 45 to cover the isolation layer 45. Furthermore, plural spacers (not shown) are formed on sidewalls (not shown) of the gate structures 10, 20, 30 and 40.

For example, the gate layers 13, 27, 33 and 47 are polysilicon layers. In addition, the gate dielectric layers 11, 21, 31 and 41 are oxide layers, the isolation layers 25 and 45 are oxide layers, and the charge storage layers 23 and 43 are nitride layers or polysilicon layers. In other words, each of the charge storage structures 26 and 46 is an oxide-nitride-oxide (ONO) structure or an oxide-polysilicon-oxide structure. In case that the charge storage structures 26 and 46 are oxide-nitride-oxide (ONO) structures, the memory transistors $M_{M1}$ and $M_{M2}$ are charge-trap transistors. In case that the charge storage structures 26 and 46 are oxide-polysilicon-oxide structures, the memory transistors $M_{M1}$ and $M_{M2}$ are floating gate transistors.

Furthermore, plural p-doped regions 51, 53, 55, 57 and 59 are formed under the surface of the N-well region NW. The gate structure 10 is located over the region between the p-doped region 51 and the p-doped region 53. The p-doped region 51 is located beside a first side of the gate structure 10 and under the surface of the N-well region NW. The p-doped region 53 is located beside a second side of the gate structure 10 and under the surface of the N-well region NW. The gate structure 20 is located over the region between the p-doped region 53 and the p-doped region 59. The p-doped region 53 is located beside a first side of the gate structure 20 and under the surface of the N-well region NW. The p-doped region 59 is located beside a second side of the gate structure 20 and under the surface of the N-well region NW. The gate structure 30 is located over the region between the p-doped region 55 and the p-doped region 57. The p-doped region 55 is located beside a first side of the gate structure 30 and under the surface of the N-well region NW. The p-doped region 57 is located beside a second side of the gate structure 30 and under the surface of the N-well region NW. The gate structure 40 is located over the region between the p-doped region 57 and the p-doped region 59. The p-doped region 57 is located beside a first side of the gate structure 40 and under the surface of the N-well region NW. The p-doped region 59 is located beside a second side of the gate structure 40 and under the surface of the N-well region NW.

As shown in FIG. 1, the N-well region NW, the gate structure 10, the p-doped region 51 and the p-doped region 53 are collaboratively formed as the select transistor $M_{S1}$. The N-well region NW, the gate structure 20, the p-doped region 53 and the p-doped region 59 are collaboratively formed as the memory transistor $M_{M1}$. The N-well region NW, the gate structure 30, the p-doped region 55 and the p-doped region 57 are collaboratively formed as the select transistor $M_{S2}$. The N-well region NW, the gate structure 40, the p-doped region 57 and the p-doped region 59 are collaboratively formed as the memory transistor $M_{M2}$. The select transistors $M_{S1}$ and $M_{S2}$ and the memory transistors $M_{M1}$ and $M_{M2}$ are p-type transistors. Consequently, in the memory cell $Cell_1$, the p-doped region 53 is a shared p-doped region of the select transistor $M_{S1}$ and the memory transistor $M_{M1}$. Similarly, in the memory cell $Cell_2$, the p-doped region 57 is a shared p-doped region of the select transistor $M_{S2}$ and the memory transistor $M_{M2}$. In addition, the p-doped region 59 is a shared p-doped region of the memory transistor $M_{M1}$ and the memory transistor $M_{M2}$.

The p-doped regions 51, 59 and 55 are electrically connected with control terminals $T_{C1}$, $T_{C2}$ and $T_{C3}$, respectively. The gate layers 13 and 33 are electrically connected with select gate terminals $T_{SG1}$ and $T_{SG2}$, respectively. The gate layers 27 and 47 are electrically connected with the memory gate terminals $T_{MG1}$ and $T_{MG2}$, respectively.

In the memory cell $Cell_1$, the first drain/source terminal of the select transistor $M_{S1}$ is connected with the control terminal $T_{C1}$, the second drain/source terminal of the select transistor $M_{S1}$ is connected with the first drain/source terminal of the memory transistor $M_{M1}$, the gate terminal of the select transistor $M_{S1}$ is connected with the select gate terminal $T_{SG1}$, the second drain/source terminal of the memory transistor $M_{M1}$ is connected with the control terminal $T_{C2}$, and the gate terminal of the memory transistor $M_{M1}$ is connected with the memory gate terminal $T_{MG1}$. In the memory cell $Cell_2$, the first drain/source terminal of the select transistor $M_{S2}$ is connected with the control terminal $T_{C3}$, the second drain/source terminal of the select transistor $M_{S2}$ is connected with the first drain/source terminal of the memory transistor $M_{M2}$, the gate terminal of the select transistor $M_{S2}$ is connected with the select gate terminal $T_{SG2}$, the second drain/source terminal of the memory transistor $M_{M2}$ is connected with the control terminal $T_{C2}$, and the gate terminal of the memory transistor $M_{M2}$ is connected with the memory gate terminal $T_{MG2}$. That is, the control terminal $T_{C2}$ is shared by the memory cell $Cell_1$ and the memory cell $Cell_2$.

By providing proper bias voltages to the terminals $T_{C1}$, $T_{C2}$, $T_{C3}$, $T_{SG1}$, $T_{SG2}$, $T_{MG1}$ and $T_{MG2}$, a program action can be performed on any of the memory cells $Cell_1$ and $Cell_2$. For example, in case that no carriers are stored in the memory transistor $M_{M1}$ of the memory cell $Cell_1$, the memory cell $Cell_1$ is in an erased state. Whereas, in case that carriers are stored in the memory transistor $M_{M1}$ of the memory cell $Cell_1$, the memory cell $Cell_1$ is in a programmed state. For example, the carriers are electrons or holes.

For allowing the normal operation of the array structure and preventing from the generation of the leakage current, the N-well voltage $V_{NW}$ received by the N-well region NW and each of the p-doped regions 51, 53, 55, 57 and 59 cannot be forward biased. That is, the N-well voltage $V_{NW}$ received by the N-well region NW is higher than or equal to the voltage received by each of the p-doped regions 51, 53, 55, 57 and 59. That is, the N-well voltage $N_{NW}$ received by the N-well region NW is higher than or equal to the voltage of the terminals $T_{C1}$, $T_{C2}$ and $T_{C3}$.

Figure 2A:
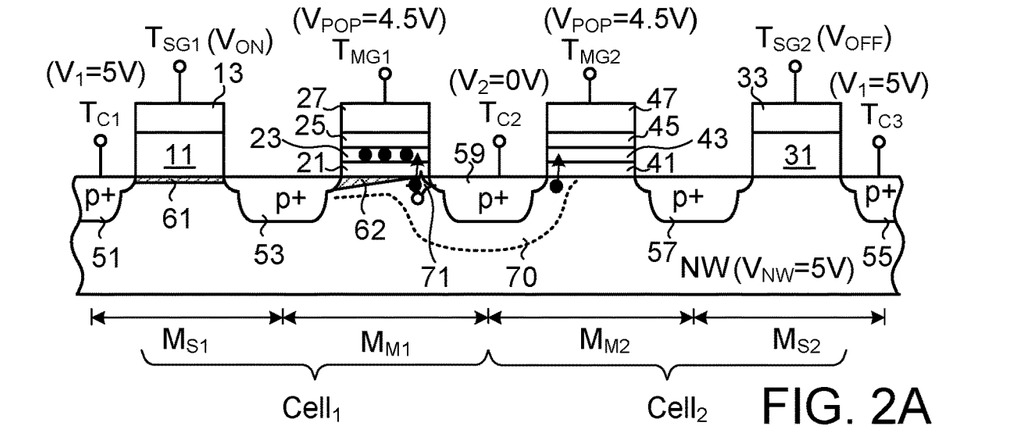
FIG. 2A schematically illustrates the bias voltages for performing a program action on the memory cell of the array structure according to a first embodiment of the present invention.

FIG. 2A schematically illustrates the bias voltages for performing a program action on the memory cell of the array structure according to a first embodiment of the present invention. When the program action is performed on the array structure, a first voltage $V_1$ is provided to the control terminals $T_{C1}$ and $T_{C3}$, and a second voltage $V_2$ is provided to the control terminal $T_{C2}$. The first voltage $V_1$ is higher than the second voltage $V_2$. For example, the first voltage $V_1$ is equal to 5V, and the second voltage $V_2$ is equal to a ground voltage (e.g., 0V). In addition, the N-well voltage $V_{NW}$ received by the N-well region NW is equal to the first voltage $V_1$. Since the N-well region NW is equal to the first voltage $V_1$ (e.g., 5V) and the p-doped region 59 receives the second voltage $V_2$ (e.g., 0V), there is a reverse bias between the N-well region NW and the p-doped region 59. In other words, a wider depletion region 70 indicated as dotted lines is formed in the junction between the N-well region NW and the p-doped region 59.

In addition, a program operation voltage $V_{POP}$ is provided to the memory gate terminals $T_{MG1}$ and $T_{MG2}$, an on voltage $V_{ON}$ is provided to the select gate terminal $T_{SG1}$, and an off voltage $V_{OFF}$ is provided to the select gate terminal $T_{SG2}$. Consequently, the memory cell $Cell_1$ is the selected memory cell, and the memory cell $Cell_2$ is the non-selected memory cell. For example, the on voltage $V_{ON}$ is 0V, the off voltage $V_{OFF}$ is 5V, and the program operation voltage $V_{POP}$ is 4.5V.

Please refer to FIG. 2A again. In the non-selected memory cell $Cell_2$, the select gate terminal $T_{SG2}$ receives the off voltage $V_{OFF}$. Consequently, the select transistor $M_{S2}$ is turned off, and no channel is formed between the p-doped regions 55 and 57. In the memory transistor $M_{M2}$, no channel is formed between the p-doped regions 57 and 59. Consequently, the program action is unable to be performed on the non-selected memory cell $Cell_2$, and the non-selected memory cell $Cell_2$ is maintained in the erased state.

In the selected memory cell $Cell_1$, the select gate terminal $T_{SG1}$ receives the on voltage $V_{ON}$. Consequently, the select transistor $M_{S1}$ is turned on, and a p-channel 61 is formed between the p-doped regions 51 and 53. Under this circumstance, the first voltage $V_1$ (e.g., 5V) received by the p-doped region 51 is transmitted to the p-doped region 53. In the memory transistor $M_{M1}$, the memory gate terminal $T_{MG1}$ receives the program operation voltage $V_{POP}$, the p-doped region 59 receives the ground voltage (0V), and the p-doped region 53 receives the first voltage $V_1$ (e.g., 5V). Since the first voltage $V_1$ (e.g., 5V) received by the p-doped region 53 is higher than the ground voltage (e.g., 0V) received by the p-doped region 59, a tapered p-channel 62 is formed between the p-doped regions 53 and 59. In addition, the p-channel 62 is pinched off near the p-doped region 59.

Please refer to FIG. 2A again. The voltage difference between the p-doped regions 53 and 59 is 5V, i.e., $V_1-V_2=5V$. In addition, an electric field is generated. In the p-channel 62, the holes are accelerated by the electric field to acquire higher energy. In the pinch off point 71 of the p-channel 62, the high-speed holes impact the depletion region 70. Consequently, electron-hole pairs are generated in the depletion region 70. Due to the attraction of the program operation voltage $V_{POP}$, the generated electrons are transferred through the gate dielectric layer 21 and stored into the charge storage layer 23 of the memory transistor $M_{M1}$. Consequently, the selected memory cell $Cell_1$ is changed to the programmed state, and the program action is completed. Under this circumstance, a channel hot hole induced hot electron injection effect (also referred as a CHHIHEI effect) is generated.

However, in the non-selected memory cell $Cell_2$, the memory gate terminal $T_{MG2}$ of the memory transistor $M_{M2}$ receives the same program operation voltage $V_{POP}$, and there is a reverse bias between the N-well region NW and the p-doped region 59. Consequently, a band-to-band tunneling effect (also referred as a BTBT effect) is generated. Consequently, portions of the electrons in the depletion region 70 are transferred through the gate dielectric layer 41 and stored into the charge storage layer 43 of the memory transistor $M_{M2}$. Consequently, the program disturbance is generated, and the storage state of the non-selected memory cell $Cell_2$ is generated. Due to the program disturbance, the non-selected memory cell $Cell_2$ may be erroneously programmed. That is, during the program action, the program disturbance of the non-selected memory cell in the array structure is as small as possible.

Figure 2B:
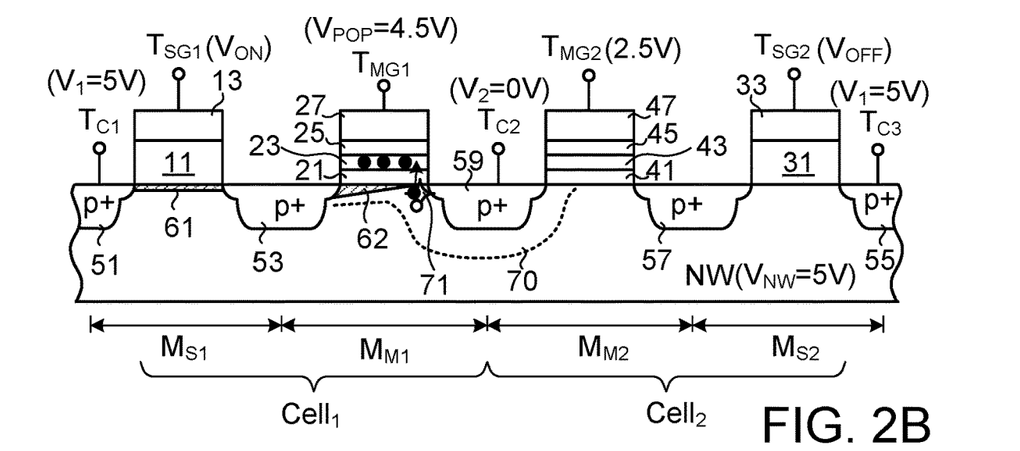
FIG. 2B schematically illustrates the bias voltages for performing a program action on the memory cell of the array structure according to a second embodiment of the present invention.

FIG. 2B schematically illustrates the bias voltages for performing a program action on the memory cell of the array structure according to a second embodiment of the present invention. In comparison with the first embodiment, the magnitude of the program operation voltage $V_{POP}$ provided to the memory gate terminal $T_{MG2}$ of the memory transistor $M_{M2}$ is much lower. For example, the magnitude of the program operation voltage $V_{POP}$ provided to the memory gate terminal $T_{MG2}$ of the memory transistor $M_{M2}$ is 2.5V. Consequently, when the program action is performed, the BTBT effect will be effectively reduced. In other words, the program disturbance of the non-selected memory cell Cell$_2$ will be reduced.

In the biasing method of FIG. 2B, two different bias voltages are respectively provided to the memory gate terminal $T_{MG1}$ of the memory cell Cell$_1$ and the memory gate terminal $T_{MG2}$ of the memory cell Cell$_2$ when the program action is performed. Consequently, according to the conducting line layout, two separate conducting lines are connected with the corresponding driving circuits. That is, it is necessary to design the complicated conducting line layout of the metal layer over the semiconductor substrate. Furthermore, it is necessary to design two driving circuits (not shown) on the semiconductor substrate in order to provide two voltages to the memory gate terminal $T_{MG1}$ of the memory cell Cell$_1$ and the memory gate terminal $T_{MG2}$ of the memory cell Cell$_2$ through two conducting lines. Consequently, the use of the biasing method of FIG. 2B results in less program disturbance of the non-selected memory cell in the array structure when the program action is performed. However, since the number of the driving circuits increases, the conducting line layout is more complicated. In other words, the size of the non-volatile memory is larger.

In the biasing method of FIG. 2A, the program operation voltage $V_{POP}$ provided to the memory gate terminal $T_{MG1}$ of the memory cell Cell$_1$ and the program operation voltage $V_{POP}$ provided to the memory gate terminal $T_{MG2}$ of the memory cell Cell$_2$ are identical when the program action is performed. Consequently, the memory gate terminals $T_{MG1}$ and $T_{MG2}$ may be connected with each other, and the conducting line layout will be simplified. In addition, only a driving circuit on the semiconductor substrate to provide the program operation voltage $V_{POP}$ is feasible. In other words, the use of the biasing method of FIG. 2A results in less driving circuits in the array structure when the program action is performed. In addition, the conducting line layout is simplified, and the size of the non-volatile memory is smaller. However, the non-selected memory cell in the array structure is readily subjected to the program disturbance.

As mentioned above, the biasing methods of FIGS. 2A and 2B have some drawbacks. In other words, the biasing method for the array structure needs to be further improved.

Figure 3A:
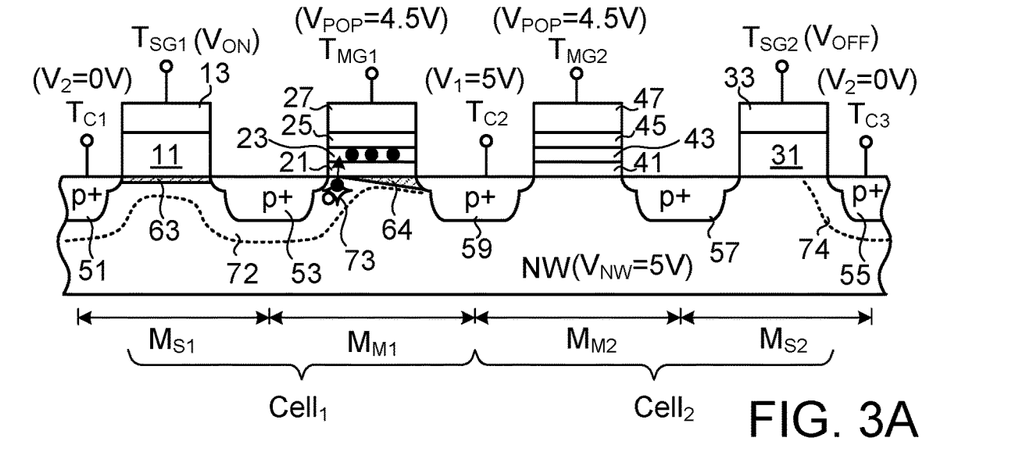
FIG. 3A schematically illustrates the bias voltages for performing a program action on the memory cell of the array structure according to a third embodiment of the present invention.

FIG. 3A schematically illustrates the bias voltages for performing a program action on the memory cell of the array structure according to a third embodiment of the present invention. The array structure of this embodiment is identical to that of FIG. 1, and not redundantly described herein.

When the program action is performed on the array structure, a first voltage $V_1$ is provided to the control terminal $T_{C2}$, and a second voltage $V_2$ is provided to the control terminals $T_{C1}$ and $T_{C3}$. The first voltage $V_1$ is higher than the second voltage $V_2$. For example, the first voltage $V_1$ is equal to 5V, and the second voltage $V_2$ is equal to a ground voltage (e.g., 0V). In addition, the N-well voltage $V_{NW}$ received by the N-well region NW is equal to the first voltage $V_1$.

In addition, a program operation voltage $V_{POP}$ is provided to the memory gate terminals $T_{MG1}$ and $T_{MG2}$, an on voltage $V_{ON}$ is provided to the memory gate terminal $T_{MG1}$, and an off voltage $V_{OFF}$ is provided to the select gate terminal $T_{SG2}$. Consequently, the memory cell Cell$_1$ is the selected memory cell, and the memory cell Cell$_2$ is the non-selected memory cell. For example, the on voltage $V_{ON}$ is 0V, the off voltage $V_{OFF}$ is 5V, and the program operation voltage $V_{POP}$ is 4.5V.

Please refer to FIG. 3A again. In the non-selected memory cell Cell$_2$, the select transistor $M_{S2}$ is turned off, and no channel is formed between the p-doped regions 55 and 57. In the memory transistor $M_{M2}$, no channel is formed between the p-doped regions 57 and 59. Consequently, the program action is unable to be performed on the non-selected memory cell Cell$_2$, and the non-selected memory cell Cell$_2$ is maintained in the erased state. In addition, since the voltage difference between the N-well region NW and the p-doped region 59 is 0V, no depletion region or a very narrow depletion region is formed in the junction between the N-well region NW and the p-doped region 59.

Moreover, since the N-well voltage $V_{NW}$ is equal to the first voltage $V_1$ (e.g., 5V) and the p-doped region 55 receives the second voltage $V_2$ (e.g., 0V), there is a reverse bias between the N-well region NW and the p-doped region 55. In other words, a wider depletion region 74 indicated as dotted lines is formed in the junction between the N-well region NW and the p-doped region 55, which may generate the BTBT effect. However, since there is no charge storage layer in the select transistor $M_{S2}$ beside the depletion region 74, the use of the biasing method of FIG. 3A will not result in the program disturbance of the non-selected memory cell Cell$_2$ during the program action. In addition, the storage state of the Cell$_2$ will not be changed.

In the selected memory cell Cell$_1$, the select gate terminal $T_{SG1}$ receives the on voltage $V_{ON}$. Consequently, the select transistor $M_{S1}$ is turned on, and a p-channel 63 is formed between the p-doped regions 51 and 53. Under this circumstance, the second voltage $V_2$ (e.g., 0V) received by the p-doped region 51 is transmitted to the p-doped region 53 through the p-channel 63 after subtracting a threshold voltage (e.g., −0.7V) of the select transistor $M_{S1}$. That is, the voltage on the p-doped region 53 is equal to 0.7V [0V−(−0.7V)]. Since the N-well region NW receives the first voltage $V_1$ (e.g., 5V), a wider depletion region 72 indicated as dotted lines is formed in the junction between the p-doped region 51, the p-channel 63, the p-doped region 53 and the N-well region NW.

In the memory transistor $M_{M1}$, the memory gate terminal $T_{MG1}$ receives the program operation voltage $V_{POP}$, the p-doped region 59 receives the first voltage $V_1$ (e.g., 5V), and the p-doped region 53 receives 0.7V. Since the first voltage $V_1$ (e.g., 5V) received by the p-doped region 59 is higher than the voltage received by the p-doped region 53 (e.g., 0.7V), a tapered p-channel 64 is formed between the p-doped regions 53 and 59. In addition, the p-channel 64 is pinched off near the p-doped region 53.

Please refer to FIG. 3A again. The voltage difference between the p-doped regions 59 and 53 is 4.3V, i.e., $V_1−(V_2+0.7V)=4.3V$. In addition, an electric field is generated. In the p-channel 64, the holes are accelerated by the electric field to acquire higher energy. In the pinch off point 73 of the p-channel 64, the high-speed holes impact the depletion region 72. Consequently, electron-hole pairs are generated in the depletion region 72. Due to the CHHIHEI effect, electrons are attracted in response to the program operation voltage $V_{POP}$. Consequently, electrons near the pinch off point 73 are transferred through the gate dielectric layer 21 and stored into the charge storage layer 23 of the memory transistor $M_{M1}$. Consequently, the selected memory cell Cell$_1$ is changed to the programmed state, and the program action is completed.

As shown in FIG. 3A, the pinch off point 73 of the p-channel 64 is away from the non-selected memory cell Cell$_2$. In addition, there is nearly no depletion region in the junction between the N-well region NW and the p-doped region 59. The memory gate terminal $T_{MG2}$ of the memory transistor $M_{M2}$ also receives the same program operation voltage $V_{POP}$. However, the memory transistor $M_{M2}$ cannot generate the BTBT effect. In other words, the use of the biasing method of FIG. 3A will not result in the program disturbance of the non-selected memory cell Cell$_2$ during the program action. In addition, the storage state of the Cell$_2$ will not be changed.

As mentioned above, the use of the biasing method of the third embodiment will not result in the program disturbance of the non-selected memory cell. In addition, the program operation voltage $V_{POP}$ provided to the memory gate terminal $T_{MG1}$ of the memory cell Cell$_1$ and the program operation voltage $V_{POP}$ provided to the memory gate terminal $T_{MG2}$ of the memory cell Cell$_2$ are identical when the program action is performed. Consequently, only a driving circuit on the semiconductor substrate to provide the program operation voltage $V_{POP}$ is feasible. In addition, the memory gate terminals $T_{MG1}$ and $T_{MG2}$ may be connected with each other. Consequently, the conducting line layout will be simplified, a decoder can be omitted, and the size of the non-volatile memory can be effectively reduced.

As mentioned above, the select transistor $M_{S1}$ and the memory transistor $M_{M1}$ in the memory cell Cell$_1$ are p-type transistors. In order to allow the pinch off point 73 of the p-channel 64 in the memory transistor $M_{M1}$ to be located near the p-doped region 53, the associated bias voltages are set according to the following rules.

Firstly, the N-well voltage $V_{NW}$ received by the N-well region NW is higher than or equal to the first voltage $V_1$ received by the p-doped region 59. When the N-well voltage $V_{NW}$ is equal to the first voltage $V_1$, there is no reverse bias between the N-well region NW and the p-doped region 59, so the BTBT effect would not be generated. When the N-well voltage $V_{NW}$ is higher than the first voltage $V_1$, there is a reverse bias between the N-well region NW and the p-doped region 59. However, since there is a barrier voltage $V_{BR}$ determined according to the barrier height of the gate dielectric layer 21 and 41, if the voltage difference between the N-well voltage $V_{NW}$ and the first voltage $V_1$ is lower than the barrier voltage $V_{BR}$ (e.g., 3V), the generation of the BTBT effect can be effectively avoided. In other words, $0V \leq (V_{NW}-V_1) \leq 3V$, and $V_{NW} \geq V_1$. In the situation of FIG. 3A, $(V_{NW}-V_1)=0V$. That is, the above rule is satisfied.

Moreover, in case that the first voltage $V_1$ is higher than the second voltage $V_2$ and the voltage difference between the first voltage $V_1$ and the second voltage $V_2$ is higher than the barrier voltage $V_{BR}$ (e.g., 3V), the CHHIHEI effect can be generated. That is, $(V_1-V_2)>3V$, and $V_1>V_2$. In the situation of FIG. 3A, $(V_1-V_2)=5V$. That is, the above rule is satisfied.

In addition, the N-well voltage $V_{NW}$ is higher than the on voltage $V_{ON}$, and the voltage difference between the N-well voltage $V_{NW}$ and the on voltage $V_{ON}$ is higher than the voltage difference between the first voltage $V_1$ and the second voltage $V_2$. That is, $(V_{NW}-V_{ON}) \geq (V_1-V_2)$. In the situation of FIG. 3A, $(V_{NW}-V_{ON})=(V_1-V_2)=5V$. That is, the above rule is satisfied.

The bias voltages shown in FIG. 3A may be adjusted according to the practical requirements. For example, when the program action is performed, the on voltage $V_{ON}$ is lower than or equal to 0V. For example, the on voltage $V_{ON}$ is $-2V$. Consequently, the select transistor $M_{S1}$ can be turned on completely. In addition, the program operation voltage $V_{POP}$ is a fixed voltage, or the program operation voltage $V_{POP}$ is a variable voltage. For example, when the program action is performed, the program operation voltage $V_{POP}$ is gradually increased from 4.5V to 7.5V. Consequently, the CHHIHEI effect is generated continuously, and the program efficiency of the selected memory cell Cell$_1$ is increased.

By using the biasing method of the third embodiment to generate the CHHIHEI effect, electrons are injected into the charge storage layer 23 of the memory transistor $M_{M1}$. In some other embodiments, another program operation voltage $V_{POP}$ is provided, and thus holes are injected into the charge storage layer 23 of the memory transistor $M_{M1}$.

Figure 3B:
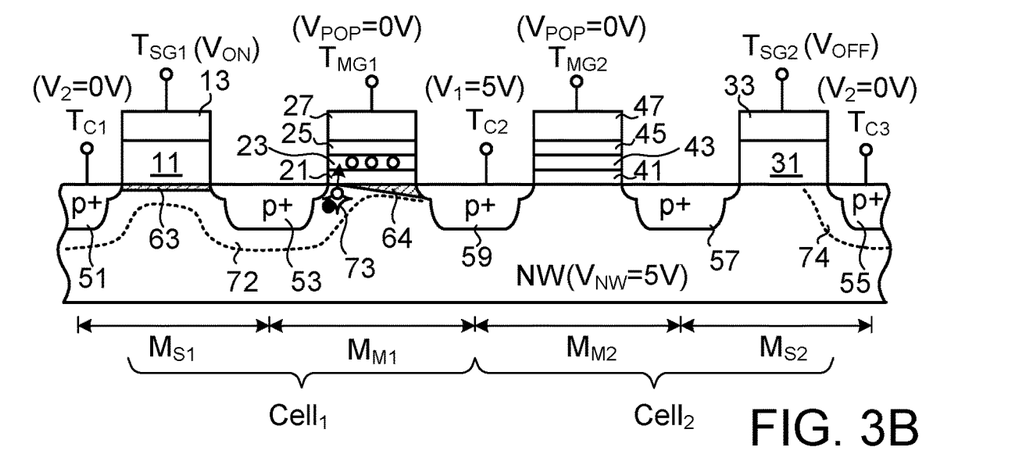
FIG. 3B schematically illustrates the bias voltages for performing a program action on the memory cell of the array structure according to a fourth embodiment of the present invention.

FIG. 3B schematically illustrates the bias voltages for performing a program action on the memory cell of the array structure according to a fourth embodiment of the present invention. The array structure of this embodiment is identical to that of FIG. 1, and not redundantly described herein.

In comparison with the third embodiment, the magnitudes of the program operation voltage $V_{POP}$ provided to the memory gate terminals $T_{MG1}$ and $T_{MG2}$ are different. The bias voltages provided to the other terminals $T_{C1}$, $T_{C2}$, $T_{C3}$, $T_{SG1}$ and $T_{SG2}$ are identical to those of the third embodiment, and not redundantly described herein. For example, when the program operation voltage $V_{POP}$ is much lower than 5V (e.g., 0V), the memory transistor $M_{M1}$ is completely turned-on or nearly completely turned-on.

Please refer to FIG. 3B. In the pinch off point 73 of the p-channel 63, the high-speed holes impact the depletion region 72. Consequently, electron-hole pairs are generated in the depletion region 73, and a channel hot hole injection effect (also referred as a CHHI effect) is generated. Due to the CHHI effect, holes are transferred through the gate dielectric layer 21 and stored into the charge storage layer 23 of the memory transistor $M_{M1}$. Consequently, the selected memory cell Cell$_1$ is changed to the erased state, and the program action is completed.

As mentioned above, by using the biasing method of FIG. 3A and the biasing method of FIG. 3B, hot carriers can be injected into the charge storage layer 23 of the memory transistor $M_{M1}$. The use of the biasing method of FIG. 3A allows electrons to be injected into the charge storage layer 23 of the memory transistor $M_{M1}$. The use of the biasing method of FIG. 3B allows holes to be injected into the charge storage layer 23 of the memory transistor $M_{M1}$.

Figure 4:
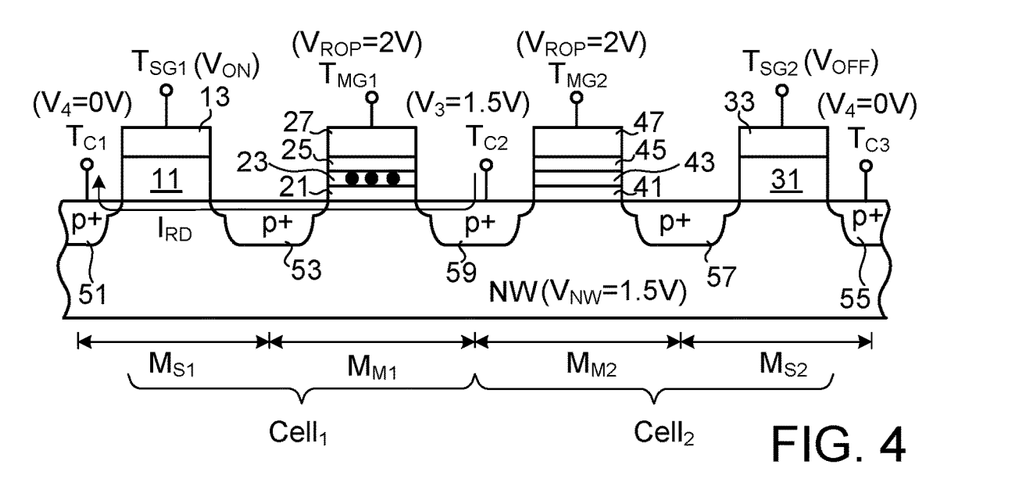
FIG. 4 schematically illustrates the bias voltages for performing a read action on the memory cell of the array structure of the present invention.

FIG. 4 schematically illustrates the bias voltages for performing a read action on the memory cell of the array structure of the present invention. When the read action is performed on the array structure, a third voltage $V_3$ is provided to the control terminal $T_{C2}$, and a fourth voltage $V_4$ is provided to the control terminals $T_{C1}$ and $T_{C3}$. The third voltage $V_3$ is higher than the fourth voltage $V_4$. For example, the third voltage $V_3$ is equal to 1.5V, and the fourth voltage $V_4$ is equal to the ground voltage (e.g., 0V). In addition, the N-well voltage $V_{NW}$ received by the N-well region NW is equal to the third voltage $V_3$.

In addition, a read operation voltage $V_{ROP}$ is provided to the memory gate terminals $T_{MG1}$ and $T_{MG2}$, an on voltage $V_{ON}$ is provided to the select gate terminal $T_{SG1}$, and an off voltage $V_{OFF}$ is provided to the select gate terminal $T_{SG2}$. Consequently, the memory cell Cell$_1$ is the selected memory cell, and the memory cell Cell$_2$ is the non-selected memory cell. For example, the on voltage $V_{ON}$ is 0V, the off voltage $V_{OFF}$ is 1.5V, and the read operation voltage $V_{ROP}$ is 2.0V.

Please refer to FIG. 4 again. In the non-selected memory cell Cell$_2$, the select gate terminal $T_{SG2}$ receives the off voltage $V_{OFF}$. Consequently, the select transistor $M_{S2}$ is turned off, and no read current is generated by the non-selected memory cell Cell$_2$.

In the selected memory cell Cell$_1$, the select gate terminal $T_{SG1}$ receives the on voltage $V_{ON}$. Consequently, the select transistor $M_{S1}$ is turned on, and a read current $I_{RD}$ is generated by the selected memory cell $Cell_1$. In addition, the read current $I_{RD}$ flows from the control terminal $T_{C2}$ to the control terminal $T_{C1}$. The storage state of the selected memory cell $Cell_1$ can be determined according to the magnitude of the read current $I_{RD}$. For example, the non-volatile memory is equipped with a comparison circuit (not shown). The comparison circuit receives the read current $I_{RD}$ and a reference current $I_{REF}$. If the read current $I_{RD}$ is higher than the reference current $I_{REF}$, the selected memory cell $Cell_1$ is in the programmed state. Whereas, if the read current $I_{RD}$ is lower than the reference current $I_{REF}$, the selected memory cell $Cell_1$ is in the erased state.

As mentioned above, the select transistor $M_{S1}$ and the memory transistor $M_{M1}$ in the memory cell $Cell_1$ are p-type transistors. The associated bias voltages for performing the read action are set according to the following rules.

Firstly, the N-well voltage $V_{NW}$ received by the N-well region NW is equal to the third voltage $V_3$ received by the p-doped region 59. That is, $V_{NW}=V_3$. Since the N-well voltage $V_{NW}$ and the third voltage $V_3$ are both 1.5V, the above rule is satisfied.

Moreover, the third voltage $V_3$ is higher than the fourth voltage $V_4$, and the voltage difference between the third voltage $V_3$ and the fourth voltage $V_4$ is lower than the barrier voltage $V_{BR}$ (e.g., 3V). Consequently, during the read action, the CHHIHEI effect is not generated, and the selected memory cell $Cell_1$ is not erroneously programmed. The voltage difference between the third voltage $V_3$ and the fourth voltage $V_4$ is lower than 3V, i.e., $(V_3-V_4)<3V$. In the situation of FIG. 4, $(V_3-V_4)=1.5V$. That is, the above rule is satisfied.

In addition, the N-well voltage $V_{NW}$ is higher than the on voltage $V_{ON}$, and the voltage difference between the N-well voltage $V_{NW}$ and the on voltage $V_{ON}$ is higher than the voltage difference between the third voltage $V_3$ and the fourth voltage $V_4$. That is, $(V_{NW}-V_{ON})\geq(V_3-V_4)$. In the situation of FIG. 4, $(V_{NW}-V_{ON})=(V_3-V_4)=1.5V$. That is, the above rule is satisfied.

The bias voltages shown in FIG. 4 may be adjusted according to the practical requirements. When the read action is performed, the on voltage $V_{ON}$ is lower than or equal to 0V. For example, the on voltage $V_{ON}$ is −0.5V. Consequently, the select transistor $M_{S1}$ can be turned on completely. In addition, the read operation voltage $V_{ROP}$ is higher than 0V and lower than 2.2V.

The bias voltages for performing the read action are not restricted to the bias voltages shown in FIG. 4 as long as the above rules are satisfied. For example, when the read action is performed, bias voltage of 2.0V is provided to the control terminal $T_{C2}$, and the bias voltage of 0V is provided to the control terminals $T_{C1}$ and $T_{C3}$. In addition, the N-well voltage $V_{NW}$ received by the N-well region NW is 2.0V. In addition, the read operation voltage $V_{ROP}$ provided to the memory gate terminals $T_{MG1}$ and $T_{MG2}$ is 2.2V, the on voltage $V_{ON}$ provided to the select gate terminal $T_{SG1}$ is 0V, and the off voltage $V_{OFF}$ provided to the select gate terminal $T_{SG2}$ is 2.0V.

In the above embodiments, the transistors of the memory cell are p-type transistors. Of course, the technologies of the present invention can be also applied to the memory cell with n-type transistors.

Figure 5:
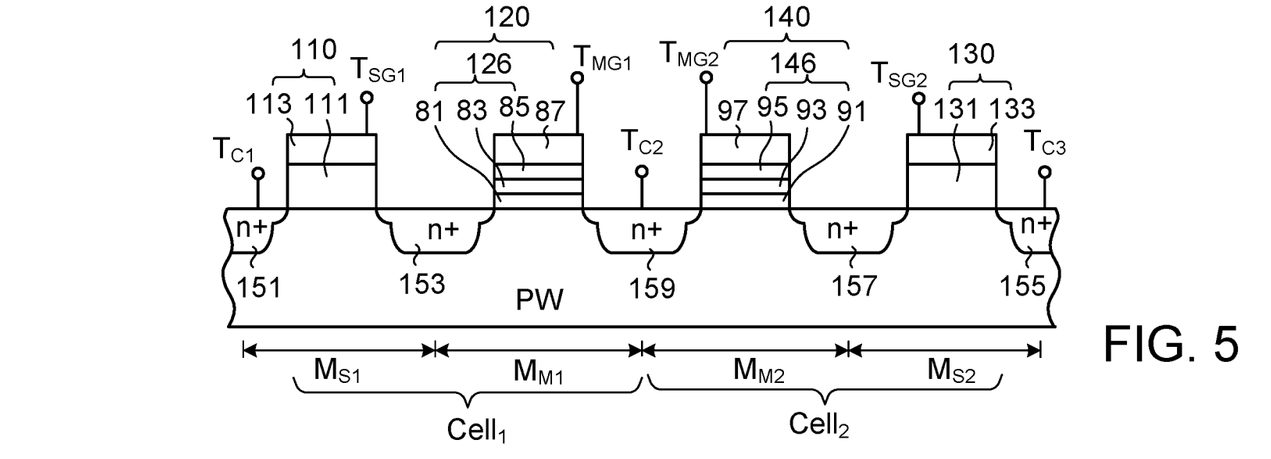
FIG. 5 is a schematic cross-sectional view illustrating an array structure with plural non-volatile memory cells according to another embodiment of the present invention.

FIG. 5 is a schematic cross-sectional view illustrating an array structure with plural non-volatile memory cells according to another embodiment of the present invention. The array structure as shown in FIG. 5 is similar to the array structure shown in FIG. 1, and not redundantly described herein.

As shown in FIG. 5, the array structure comprises two non-volatile memory cells $Cell_1$ and $Cell_2$. The memory cell $Cell_1$ comprises a select transistor $M_{S1}$ and a memory transistor $M_{M1}$. The memory cell $Cell_2$ comprises a select transistor $M_{S2}$ and a memory transistor $M_{M2}$. The memory transistors $M_{M1}$ and $M_{M2}$ are storage devices of the memory cells. For example, the memory transistors $M_{M1}$ and $M_{M2}$ are charge-trap transistors or floating gate transistors.

As shown in FIG. 5, plural gate structures 110, 120, 130 and 140 are formed over a surface of a P-well region PW in a semiconductor substrate (not shown). In addition, plural n-doped regions 151, 153, 155, 157 and 159 are formed under the surface of the P-well region PW. The gate structure 110 is formed over the surface of the P-well region PW between the n-doped region 151 and the n-doped region 153. The gate structure 120 is formed over the surface of the P-well region PW between the n-doped region 153 and the n-doped region 159. The gate structure 130 is formed over the surface of the P-well region PW between the n-doped region 157 and the n-doped region 155. The gate structure 140 is formed over the surface of the P-well region of the n-doped region 159 and the n-doped region 157.

The gate structure 110 comprises a gate dielectric layer 111 and a gate layer 113. The gate structure 120 comprises a charge storage structure 126 and a gate layer 87. The charge storage structure 126 further comprises a gate dielectric layer 81, a charge storage layer 83 and an isolation layer 85. The gate structure 130 comprises a gate dielectric layer 131 and a gate layer 133. The gate structure 140 comprises a charge storage structure 146 and a gate layer 97. The charge storage structure 146 further comprises a gate dielectric layer 91, a charge storage layer 93 and an isolation layer 95.

For example, the gate layers 113, 87, 133 and 97 are polysilicon layers. In addition, the gate dielectric layers 81, 91, 111 and 131 are oxide layers, the isolation layers 85 and 95 are oxide layers, and the charge storage layers 83 and 93 are nitride layers or polysilicon layers.

The P-well region PW, the gate structure 110, the n-doped region 151 and the n-doped region 153 are collaboratively formed as the select transistor $M_{S1}$. The P-well region PW, the gate structure 120, the n-doped region 153 and the n-doped region 159 are collaboratively formed as the memory transistor $M_{M1}$. The P-well region PW, the gate structure 130, the n-doped region 155 and the n-doped region 157 are collaboratively formed as the select transistor $M_{S2}$. The P-well region PW, the gate structure 140, the n-doped region 157 and the n-doped region 159 are collaboratively formed as the memory transistor $M_{M2}$. The select transistor $M_{S1}$, the memory transistor $M_{M1}$, the select transistor $M_{S2}$ and the memory transistor $M_{M2}$ are n-type transistors.

The n-doped regions 151, 159 and 155 are electrically connected with control terminals $T_{C1}$, $T_{C2}$ and $T_{C3}$, respectively. The gate layers 113 and 133 are electrically connected with select gate terminals $T_{SG1}$ and $T_{SG2}$, respectively. The gate layers 87 and 97 are electrically connected with the memory gate terminals $T_{MG1}$ and $T_{MG2}$, respectively.

By providing proper bias voltages to the terminals $T_{C1}$, $T_{C2}$, $T_{C3}$, $T_{SG1}$, $T_{SG2}$, $T_{MG1}$ and $T_{MG2}$, a program action can be performed on any of the memory cells $Cell_1$ and $Cell_2$. For example, in case that no carriers are stored in the memory transistor $M_{M1}$ of the memory cell $Cell_1$, the memory cell $Cell_1$ is in an erased state. Whereas, in case that the carriers are stored in the memory transistor $M_{M1}$ of the memory cell $Cell_1$, the memory cell $Cell_1$ is in a programmed state.

Figure 6:
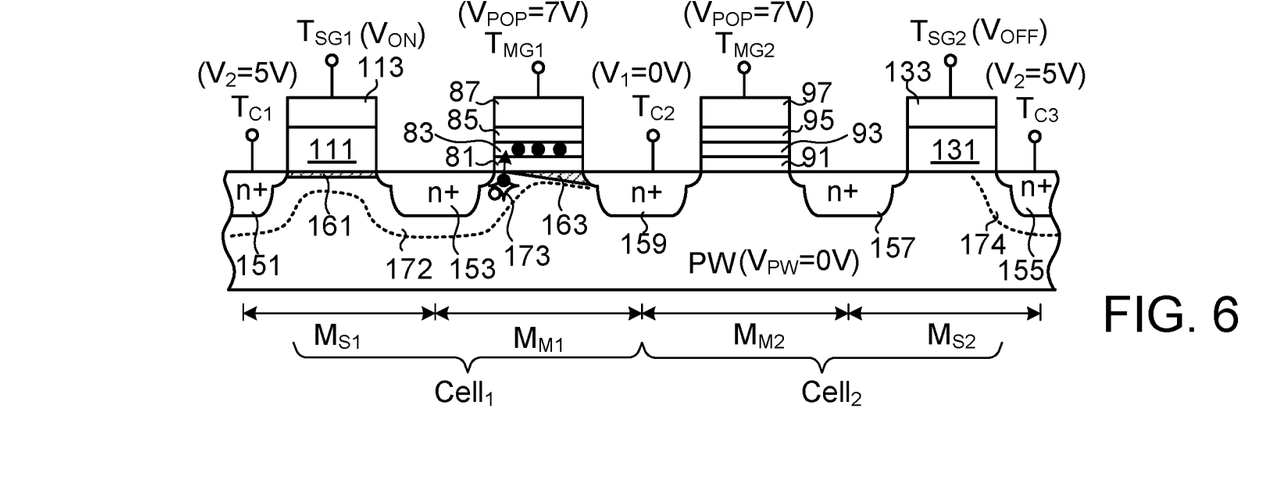
FIG. 6 schematically illustrates the bias voltages for performing a program action on the memory cell of the array structure as shown in FIG. 5.

FIG. 6 schematically illustrates the bias voltages for performing a program action on the memory cell of the array structure as shown in FIG. 5. When the program action is performed on the array structure, a first voltage $V_1$ is provided to the control terminal $T_{C2}$, and a second voltage $V_2$ is provided to the control terminals $T_{C1}$ and $T_{C3}$. The first voltage $V_1$ is lower than the second voltage $V_2$. For example, the first voltage $V_1$ is equal to a ground voltage (e.g., 0V), and the second voltage $V_2$ is equal to 5V. In addition, a P-well voltage $V_{PW}$ received by the P-well region PW is equal to the first voltage $V_1$. Since the P-well voltage $V_{PW}$ is equal to the first voltage $V_1$ (e.g., 0V) and the n-doped region 155 receives the second voltage $V_2$ (e.g., 5V), there is a reverse bias between the P-well region PW and the n-doped region 155. In other words, a wider depletion region 174 indicated as dotted lines is formed in the junction between the P-well region PW and the n-doped region 155. In addition, both of the P-well region and the n-doped region 159 receive the first voltage $V_1$ (e.g., 0V), so no depletion region or a very narrow depletion region is formed in the junction between the P-well region PW and the n-doped region 159.

In addition, a program operation voltage $V_{POP}$ is provided to the memory gate terminals $T_{MG1}$ and $T_{MG2}$, an on voltage $V_{ON}$ is provided to the select gate terminal $T_{SG1}$, and an off voltage $V_{OFF}$ is provided to the select gate terminal $T_{SG2}$. Consequently, the memory cell Cell$_1$ is the selected memory cell, but the memory cell Cell$_2$ is the non-selected memory cell. For example, the on voltage $V_{ON}$ is 5V, the off voltage $V_{OFF}$ is 0V, and the program operation voltage $V_{POP}$ is 7V.

Please refer to FIG. 6 again. In the non-selected memory cell Cell$_2$, the select gate terminal $T_{SG2}$ receives the off voltage $V_{OFF}$. Consequently, the select transistor $M_{S2}$ is turned off, and no channel is formed between the n-doped regions 155 and 157. In the memory transistor $M_{M2}$, no channel is formed between the n-doped regions 157 and 159. Consequently, the program action is unable to be performed on the on-selected memory cell Cell$_2$, and the non-selected memory cell Cell$_2$ is maintained in the erased state.

In the selected memory cell Cell$_1$, the select gate terminal $T_{SG1}$ receives the on voltage $V_{ON}$. Consequently, the select transistor $M_{S1}$ is turned on, and a n-channel 161 is formed between the n-doped regions 151 and 153. Under this circumstance, the second voltage $V_2$ (e.g., 5V) received by the n-doped region 151 is transmitted to the n-doped region 153 through the n-channel 161 after subtracting a threshold voltage (e.g., 0.7V) of the select transistor $M_{S1}$. That is, the voltage on the n-doped region 153 is equal to 4.37V [5V−(0.7V)]. Since the p-well region PW receives the first voltage $V_1$ (e.g., 0V), a wider depletion region 172 indicated as dotted lines is formed in the junction between the n-doped region 151, n-channel 161, the n-doped region 153 and the P-well region PW.

In the memory transistor $M_{M1}$, the memory gate terminal $T_{MG1}$ receives the program operation voltage $V_{POP}$, the n-doped region 159 receives the first voltage $V_1$ (e.g., 0V), and the n-doped region 153 receives 4.3V. Since the first voltage $V_1$ (e.g., 0V) received by the n-doped region 159 is lower than the voltage received by the n-doped region 153 (e.g., 4.3V), a tapered n-channel 163 is formed between the n-doped regions 159 and 153. In addition, the n-channel 163 is pinched off near the n-doped region 153.

Please refer to FIG. 6 again. The voltage difference between the n-doped regions 153 and 159 is 4.3V, i.e., 5V−0.7V=4.3V. In addition, an electric field is generated. In the n-channel 163, the electrons are accelerated by the electric field to acquire higher energy. In the pinch off point 173 of the n-channel 163, the high-speed electrons impact the depletion region 172. Consequently, electron-hole pairs are generated in the depletion region 172. Due to a channel hot electron injection effect (also referred as a CHEI effect), electrons are attracted in response to the program operation voltage $V_{POP}$. Consequently, electrons near the pinch off point 173 are transferred through the gate dielectric layer 81 and stored into the charge storage layer 83 of the memory transistor $M_{M1}$. Consequently, the selected memory cell Cell$_1$ is changed to the programmed state, and the program action is completed. In conclusion, the use of the biasing method of FIG. 6 will not result in the program disturbance of the non-selected memory cell Cell$_2$ during the program action. The reason is similar to FIG. 3B, and not redundantly described herein.

As mentioned above, the select transistor $M_{S1}$ and the memory transistor $M_{M1}$ in the memory cell Cell$_1$ are n-type transistors. In order to allow the pinch off point 173 of the n-channel 163 in the memory transistor $M_{M1}$ to be located near the n-doped region 153, the associated bias voltages are set according to the following rules.

Firstly, the first voltage $V_1$ received by the n-doped region 159 is higher than or equal to the P-well voltage $V_{PW}$ received by the P-well region PW. When the first voltage V1 is equal to the P-well voltage $V_{PW}$, there is no reverse bias between the P-well region PW and the n-doped region 159, so the BTBT effect would not be generated. When the first voltage V1 is higher than the P-well voltage $V_{PW}$, there is a reverse bias between the P-well region PW and the n-doped region 159. In addition, the voltage difference between first voltage $V_1$ and the P-well voltage $V_{PW}$ is lower than a barrier voltage $V_{BR}$. For example, in case that each of the barrier heights of the gate dielectric layers 81 and 91 of the memory transistors $M_{M1}$ and $M_{M2}$ is 3 eV (electron volt), the barrier voltage $V_{BR}$ is higher than or equal to 3V. Consequently, if the voltage difference between the first voltage $V_1$ and the P-well voltage $V_{PW}$ is lower than 3V, the generation of the BTBT effect can be effectively avoided. In other words, $0V \le (V_1-V_{PW}) \le 3V$, and $V_1 \ge V_{PW}$. In the situation of FIG. 6, $(V_1-V_{PW})=0V$. That is, the above rule is satisfied.

Moreover, in case that the second voltage $V_2$ is higher than the first voltage $V_1$ and the voltage difference between the second voltage $V_2$ and the first voltage $V_1$ is higher than the barrier voltage $V_{BR}$ (e.g., 3V), the CHEI effect can be generated. That is, $(V_2-V_1)>3V$. In the situation of FIGS. 6, $(V_2-V_1)=5V$. That is, the above rule is satisfied.

In addition, the on voltage $V_{ON}$ is higher than the P-well voltage $V_{PW}$, and the voltage difference between the on voltage $V_{ON}$ and the P-well voltage $V_{PW}$ is higher than the voltage difference between the second voltage $V_2$ and the first voltage $V_1$. That is, $(V_{ON}-V_{PW}) \ge (V_2-V_1)$. In the situation of FIG. 6, $(V_{ON}-V_{PW})=(V_2-V_1)=5V$. That is, the above rule is satisfied.

The bias voltages shown in FIG. 6 may be adjusted according to the practical requirements. For example, when the program action is performed, the on voltage $V_{ON}$ is higher than or equal to 5V. For example, the on voltage $V_{ON}$ is 7V. Consequently, the select transistor $M_{S1}$ can be turned on completely.

Figure 7A:
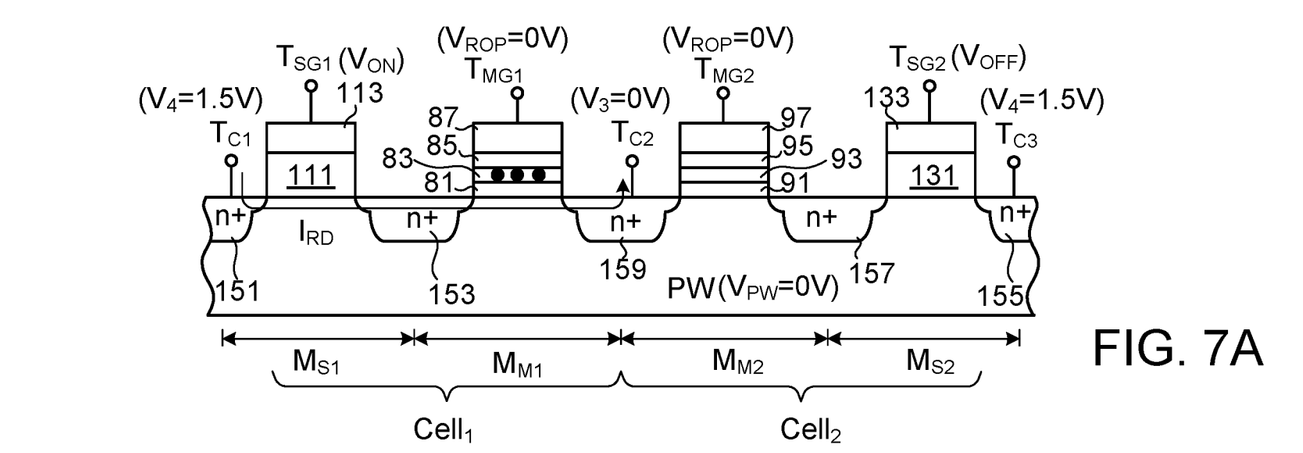
FIG. 7A schematically illustrates the bias voltages for performing a read action on the memory cell of the array structure as shown in FIG. 5.

FIG. 7A schematically illustrates the bias voltages for performing a read action on the memory cell of the array structure as shown in FIG. 5. When the read action is performed on the array structure, a third voltage $V_3$ is provided to the control terminal $T_{C2}$, and a fourth voltage $V_4$ is provided to the control terminals $T_{C1}$ and $T_{C3}$. The third voltage $V_3$ is lower than the fourth voltage $V_4$. For example, the third voltage $V_3$ is equal to the ground voltage (e.g., 0V), and the fourth voltage $V_4$ is 1.5V. In addition, the P-well voltage $V_{PW}$ received by the P-well region PW is equal to the third voltage $V_3$ (e.g., 0V).

In addition, a read operation voltage $V_{ROP}$ is provided to the memory gate terminals $T_{MG1}$ and $T_{MG2}$, an on voltage $V_{ON}$ is provided to the memory gate terminal $T_{MG1}$, and an off voltage $V_{OFF}$ is provided to the select gate terminal $T_{SG2}$. Consequently, the memory cell $Cell_1$ is the selected memory cell, and the memory cell $Cell_2$ is the non-selected memory cell. For example, the on voltage $V_{ON}$ is 1.5V, the off voltage $V_{OFF}$ is 0V, and the read operation voltage $V_{ROP}$ is 0V.

Please refer to FIG. 7A again. In the non-selected memory cell $Cell_2$, the select gate terminal $T_{SG2}$ receives the off voltage $V_{OFF}$. Consequently, the select transistor $M_{S2}$ is turned off, and no read current is generated by the non-selected memory cell $Cell_2$.

In the selected memory cell $Cell_1$, the select gate terminal $T_{SG1}$ receives the on voltage $V_{ON}$. Consequently, the select transistor $M_{S1}$ is turned on, and a read current $I_{RD}$ is generated by the selected memory cell $Cell_1$. In addition, the read current $I_{RD}$ flows from the control terminal $T_{C1}$ to the control terminal $T_{C2}$. The storage state of the selected memory cell $Cell_1$ can be determined according to the magnitude of the read current $I_{RD}$. For example, the non-volatile memory is equipped with a comparison circuit (not shown). The comparison circuit receives the read current $I_{RD}$ and a reference current $I_{REF}$. If the read current $I_{RD}$ is higher than the reference current $I_{REF}$, the selected memory cell $Cell_1$ is in the erased state. Whereas, if the read current $I_{RD}$ is lower than the reference current $I_{REF}$, the selected memory cell $Cell_1$ is in the programmed state.

As mentioned above, the select transistor $M_{S1}$ and the memory transistor $M_{M1}$ in the memory cell $Cell_1$ are n-type transistors. The associated bias voltages for performing the read action are set according to the following rules.

Firstly, the P-well voltage $V_{PW}$ received by the P-well region PW is equal to the third voltage $V_3$ received by the n-doped region 159. That is, $V_{PW}=V_3$. Since the P-well voltage $V_{PW}$ and the third voltage $V_3$ are both 0V, the above rule is satisfied.

Moreover, the fourth voltage $V_4$ is higher than the third voltage $V_3$, and the voltage difference between the fourth voltage $V_4$ and the third voltage $V_3$ is lower than the barrier voltage $V_{BR}$ (e.g., 3V). Consequently, during the read action, the CHEI effect is not generated, and the selected memory cell $Cell_1$ is not erroneously programmed. The voltage difference between the fourth voltage $V_4$ and the third voltage $V_3$ is lower than 3V. That is, $(V_4-V_3)<3V$. In the situation of FIGS. 4, $(V_3-V_4)=1.5V$. That is, the above rule is satisfied.

In addition, the on voltage $V_{ON}$ is higher than the P-well voltage $V_{PW}$, and the voltage difference between the on voltage $V_{ON}$ and the P-well voltage $V_{PW}$ is higher than or equal to the voltage difference between the fourth voltage $V_4$ and the third voltage $V_3$. That is, $(V_{ON}-V_{PW})\geq(V_4-V_3)$. In the situation of FIG. 7A, $(V_{ON}-V_{PW})=(V_4-V_3)=1.5V$. That is, the above rule is satisfied.

The bias voltages may be adjusted according to the practical requirements. When the read action is performed, the on voltage $V_{ON}$ is higher than or equal to 1.5V. For example, the on voltage $V_{ON}$ is 2.2V. Consequently, the select transistor $M_{S1}$ can be turned on completely. In addition, the read operation voltage $V_{ROP}$ can be higher than or lower than 0V, according to the programmed state and erased state distribution of the memory cell.

Figure 7B:
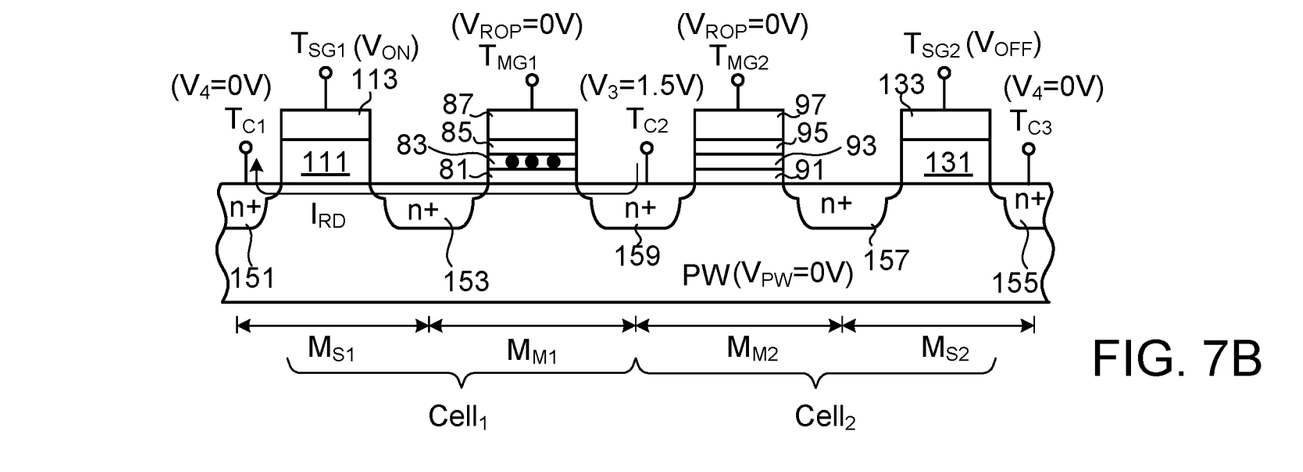
FIG. 7B schematically illustrates another bias voltages for performing a read action on the memory cell of the array structure as shown in FIG. 5.

FIG. 7B schematically illustrates another bias voltages for performing a read action on the memory cell of the array structure as shown in FIG. 5. In comparison with the biasing method of FIG. 7A, the magnitudes of the third voltage $V_3$ and the fourth voltage $V_4$ in the biasing method of FIG. 7B are distinguished.

The third voltage $V_3$ provided to the control terminal $T_{C2}$ is 1.5V, and the fourth voltage $V_4$ provided to the control terminals $T_{C1}$ and $T_{C3}$ is the equal to the ground voltage (e.g., 0V). In addition, the bias voltages provided to the terminals $T_{MG1}$, $T_{MG2}$, $T_{SG1}$ and $T_{SG2}$ are not changed. In the selected memory cell $Cell_1$, the read current $I_{RD}$ flows from the control terminal $T_{C2}$ to the control terminal $T_{C1}$. The storage state of the selected memory cell $Cell_1$ can be determined according to the magnitude of the read current $I_{RD}$.

According to the biasing methods of FIG. 7A and FIG. 7B, there is a reverse bias between the n-doped region 159 and the P-well region PW, and the absolute value of the voltage difference between the fourth voltage $V_4$ and the third voltage $V_3$ is lower than the barrier voltage $V_{BR}$ (e.g., 3V). That is, $|V_4-V_3|<V_{BR}$. In addition, the absolute value of the voltage difference between the on voltage $V_{ON}$ and the P-well voltage $V_{PW}$ is higher than or equal to the absolute value of the voltage difference between the fourth voltage $V_4$ and the third voltage $V_3$. That is, $|V_{ON}-V_{PW}|\geq|V_4-V_3|$.

In the array structure of the present invention, the biasing method of FIG. 7A or the biasing method of FIG. 7B can be used to perform the read action according to the types of the memory transistors $M_{M1}$ and $M_{M2}$. In case that the memory transistors $M_{M1}$ and $M_{M2}$ are floating gate transistors, the biasing method of FIG. 7A is used to perform the read action. Whereas, in case that the memory transistors $M_{M1}$ and $M_{M2}$ are charge-trap transistors, the biasing method of FIG. 7B is used to perform the read action.

From above descriptions, the present invention provides a non-volatile memory cell of an array structure and an associated controlling method for the non-volatile memory cell. The memory cell $Cell_1$ of the array structure comprises a select transistor $M_{S1}$ and a memory transistor $M_{M1}$. The first drain/source terminal of the select transistor $M_{S1}$ is connected with a control terminal $T_{C1}$. The second drain/source terminal of the select transistor $M_{S1}$ is connected with the first drain/source terminal of the memory transistor $M_{M1}$. The gate terminal of the select transistor $M_{S1}$ is connected with the select gate terminal $T_{SG1}$. The second drain/source terminal of the memory transistor $M_{M1}$ is connected with the control terminal $T_{C2}$. The gate terminal of the memory transistor $M_{M1}$ is connected with the memory gate terminal $T_{MG1}$. When the program action is performed on the memory cell, proper bias voltages are provided to the terminals $T_{C1}$, $T_{C2}$, $T_{C3}$, $T_{SG1}$, $T_{SG2}$, $T_{MG1}$ and $T_{MG2}$. Consequently, the select transistor $M_{S1}$ is turned on, and a tapered channel is generated in the memory transistor $M_{M1}$. The tapered channel is connected between the first drain/source terminal and the second drain/source terminal of the memory transistor $M_{M1}$. Moreover, the tapered channel of the memory transistor $M_{M1}$ is pinched off near the first drain/source terminal of the memory transistor $M_{M1}$. Consequently, the hot carriers near the pinch off point are injected into the charge storage layer of the memory transistor $M_{M1}$.

Moreover, the memory transistor is the storage device in the memory cell. Of course, the storage device in the memory cell is implemented with other electronic components. For example, in case that the memory transistor $M_{M1}$ of FIG. 1 is a floating gate transistor, the charge storage layer 23 of the memory transistor $M_{M1}$ may be regarded as a floating gate. In addition, the charge storage layer 23 connected with the gate layer 27 of the memory gate terminal $T_{MG1}$ may be regarded as a control gate. The structures of the charge storage layer 23 and the gate layer 27 are similar to two electrodes of a capacitor. Furthermore, the memory transistor of the storage device may be composed of a single-poly floating gate transistor and a coupling capacitor. The single-poly floating gate transistor only comprises two doped region and a floating gate layer, and single-poly floating gate transistor is not provided with the control gate layer. Consequently, the coupling capacitor is required. The first terminal of the coupling capacitor is connected with the floating gate layer of the single-poly floating gate transistor. The second terminal of the coupling capacitor is connected with the memory gate terminal $T_{MG1}$. Consequently, the combination structure of the single-poly floating gate transistor and the coupling capacitor can be served as the memory transistor of the memory cell.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An array structure comprising a first non-volatile memory cell and a second non-volatile memory cell, wherein the first non-volatile memory cell comprises:
   a well region;
   a first doped region, a second doped region and a third doped region formed under a surface of the well region, wherein the first doped region is connected with a first control terminal, and the third doped region is connected with a second control terminal;
   a first gate structure formed over the surface of the well region and arranged between the first doped region and the second doped region, wherein the first gate structure is connected with a first select gate terminal, and the well region, the first doped region, the second doped region and the first gate structure are collaboratively formed as a first select transistor; and
   a second gate structure formed over the surface of the well region and arranged between the second doped region and the third doped region, wherein the second gate structure is connected with a first memory gate terminal, and the well region, the second doped region, the third doped region and the second gate structure are collaboratively formed as a first memory transistor, wherein the second gate structure comprises a first charge storage layer;
   wherein the second non-volatile memory cell comprises: a second select transistor and a second memory transistor; a first drain/source terminal of the second select transistor is connected with a third control terminal, a second drain/source terminal of the second select transistor is connected with a first drain/source terminal of the second memory transistor, a gate terminal of the second select transistor is connected with a second select gate terminal, a second drain/source terminal of the second memory transistor is connected with the second control terminal, and a gate terminal of the second memory transistor is connected with a second memory gate terminal;
   wherein when a program action is performed on the first non-volatile memory cell, the second control terminal receives a first voltage, the first control terminal receives a second voltage, the first select gate terminal receives an on voltage, the first memory gate terminal receives a program operation voltage, the third control terminal receives the second voltage, the second select gate terminal receives an off voltage, and the second memory gate terminal receives the program operation voltage; and
   wherein when the second select transistor is turned off, the second non-volatile memory cell is in an erased state, wherein when the first select transistor is turned on, the second voltage is transmitted from the first doped region to the second doped region, so that a tapered channel is formed between the second doped region and the third doped region, wherein the tapered channel is pinched off near the second doped region, and plural hot carriers near a pinch off point are injected into the first charge storage layer of the second gate structure, so that the first non-volatile memory cell is in a programmed state.

2. The array structure as claimed in claim 1, wherein the second non-volatile memory cell comprises:
   a fourth doped region and a fifth doped region formed under the surface of the well region, wherein the fifth doped region is connected with the third control terminal;
   a third gate structure formed over the surface of the well region and arranged between the fourth doped region and the fifth doped region, wherein the third gate structure is connected with the second select gate terminal, and the well region, the fourth doped region, the fifth doped region and the third gate structure are collaboratively formed as the second select transistor; and
   a fourth gate structure formed over the surface of the well region and arranged between the third doped region and the fourth doped region, wherein the fourth gate structure is connected with the second memory gate terminal, and the well region, the fourth doped region, the third doped region and the fourth gate structure are collaboratively formed as the second memory transistor, wherein the fourth gate structure comprises a second charge storage layer.

3. The array structure as claimed in claim 1, wherein when the well region is an n-type well region, the first voltage is higher than the second voltage; and, when the well region is a p-type well region, the first voltage is lower than the second voltage.

4. The array structure as claimed in claim 1, wherein the second gate structure comprises a gate dielectric layer, wherein the gate dielectric layer is formed over the surface of the well region and arranged between the second doped region and the third doped region, and the first charge storage layer is formed over the gate dielectric layer to cover the gate dielectric layer.

5. The array structure as claimed in claim 4, wherein the second gate structure further comprises an isolation layer and a gate layer, wherein the isolation layer is formed over the first charge storage layer to cover the first charge storage layer, the gate layer is formed over the isolation layer to cover the isolation layer, and the first memory gate terminal is connected with the gate layer.

6. The array structure as claimed in claim 4, wherein the first doped region, the second doped region and the third doped region are p-typed doped regions, the well region is an n-type well region, and the n-type well region receives an n-type well voltage, wherein when the program action is performed, the first voltage is higher than the second voltage, the n-type well voltage is higher than or equal to the first voltage, the n-type well voltage minus the first voltage is lower than a barrier voltage, and the barrier voltage is determined according to a barrier height of the gate dielectric layer.

7. The array structure as claimed in claim 6, wherein the first voltage minus the second voltage is higher than the barrier voltage.

8. The array structure as claimed in claim 7, wherein the n-type well voltage minus the on voltage is higher than or equal to the first voltage minus the second voltage.

9. The array structure as claimed in claim 6, wherein when the program action is performed, the program operation voltage is a fixed voltage, or the program operation voltage gradually increases.

10. The array structure as claimed in claim 6, wherein when a read action is performed, the second control terminal receives a third voltage, the first control terminal receives a fourth voltage, the first select gate terminal receives the on voltage, and the first memory gate terminal receives a read operation voltage, wherein when the first select transistor is turned on, the first non-volatile memory cell generates a read current, and the read current flows from the second control terminal to the first control terminal, wherein a storage state of the first non-volatile memory cell is determined according to a magnitude of the read current.

11. The array structure as claimed in claim 10, wherein the third voltage is equal to the n-type well voltage.

12. The array structure as claimed in claim 10, wherein the third voltage is higher than the fourth voltage, and the third voltage minus the fourth voltage is lower than the barrier voltage.

13. The array structure as claimed in claim 12, wherein the n-type well voltage minus the on voltage is higher than or equal to the third voltage minus the fourth voltage.

14. The array structure as claimed in claim 4, wherein the first doped region, the second doped region and the third doped region are n-typed doped regions, the well region is a p-type well region, and the p-type well region receives a p-type well voltage, wherein when the program action is performed, a channel hot electron injection effect is generated, so that plural electrons near the pinch off point are injected into the first charge storage layer of the second gate structure, wherein the first voltage is lower than the second voltage, first voltage is higher than or equal to the p-type well voltage, the first voltage minus the p-type well voltage is lower than a barrier voltage, and the barrier voltage is determined according to a barrier height of the gate dielectric layer.

15. The array structure as claimed in claim 14, wherein the second voltage minus the first voltage is higher than the barrier voltage.

16. The array structure as claimed in claim 15, wherein the on voltage minus the p-type well voltage is higher than or equal to the second voltage minus the first voltage.

17. The array structure as claimed in claim 14, wherein when a read action is performed, the second control terminal receives a third voltage, the first control terminal receives a fourth voltage, the first select gate terminal receives the on voltage, and the first memory gate terminal receives a read operation voltage, wherein when the first select transistor is turned on, the first non-volatile memory cell generates a read current, wherein a storage state of the first non-volatile memory cell is determined according to a magnitude of the read current.

18. The array structure as claimed in claim 17, wherein third voltage is equal to the p-type well voltage.

19. The array structure as claimed in claim 17, wherein an absolute value of the third voltage minus the fourth voltage is lower than the barrier voltage.

20. The array structure as claimed in claim 19, wherein an absolute value of the on voltage minus the p-type well voltage is higher than or equal to the absolute value of the third voltage minus the fourth voltage.

21. An array structure comprising a first non-volatile memory cell, the first non-volatile memory cell comprising:
a well region;
a first doped region, a second doped region and a third doped region formed under a surface of the well region, wherein the first doped region is connected with a first control terminal, and the third doped region is connected with a second control terminal;
a first gate structure formed over the surface of the well region and arranged between the first doped region and the second doped region, wherein the first gate structure is connected with a first select gate terminal, and the well region, the first doped region, the second doped region and the first gate structure are collaboratively formed as a first select transistor; and
a second gate structure formed over the surface of the well region and arranged between the second doped region and the third doped region, wherein the second gate structure is connected with a first memory gate terminal, and the well region, the second doped region, the third doped region and the second gate structure are collaboratively formed as a first memory transistor, wherein the second gate structure comprises a first charge storage layer,
wherein when a read action is performed on the first non-volatile memory cell, the well region receives a well voltage, the second control terminal receives a first voltage, the first control terminal receives a second voltage, the first select gate terminal receives an on voltage, and the first memory gate terminal receives a read operation voltage, wherein the first voltage is higher than the second voltage, and the well voltage is equal to the first voltage,
wherein when the first select transistor is turned on, the first non-volatile memory cell generates a read current, wherein a storage state of the first non-volatile memory cell is determined according to a magnitude of the read current, and
wherein the first voltage minus the second voltage is lower than a barrier voltage, the barrier voltage is determined according to a barrier height of a gate dielectric layer, the gate dielectric layer is covered by the first charge storage layer.

22. The array structure as claimed in claim 21, wherein an absolute value of the on voltage minus the well voltage is higher than or equal to an absolute value of the first voltage minus the second voltage.

* * * * *